Dec. 11, 1962 W. C. ECKARDT ETAL 3,067,638
BALL FLOATING REAMER
Filed Aug. 8, 1961
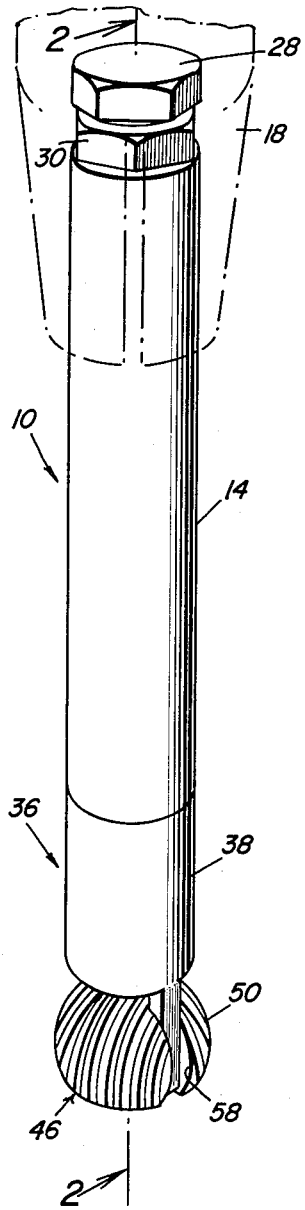
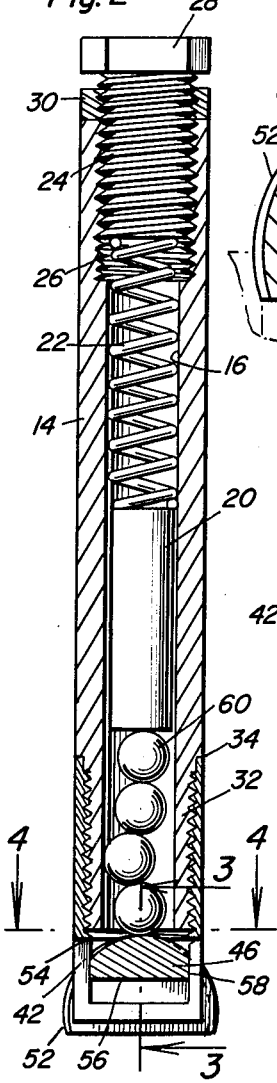
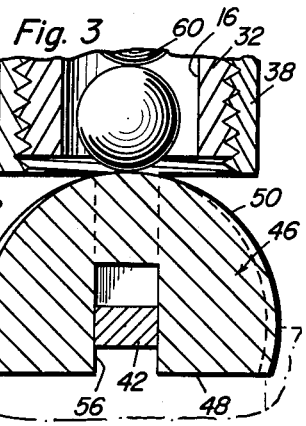
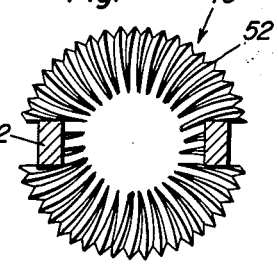
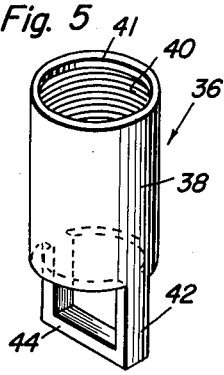
William C. Eckardt
William W. Eckardt
INVENTORS.

United States Patent Office 3,067,638
Patented Dec. 11, 1962

3,067,638
BALL FLOATING REAMER
William C. Eckardt, Buffalo, N.Y. (P.O. Box 2045, Elmira Blvd., Port Charlotte, Fla.), and William W. Eckardt, 159 Norwalk Ave., Buffalo, N.Y.
Filed Aug. 8, 1961, Ser. No. 130,186
6 Claims. (Cl. 77—72)

The present invention generally relates to a reamer and more particularly a ball floating reamer for use in precision machining without requiring constant accurate realignment and eliminating the relatively slow and costly process of hand reaming.

It has been found through practical experience that the most costly and time consuming problem in precision machining of work is accurate alignment of the equipment. Alignment of the equipment is constantly being changed due to many factors including vibrations caused by trains, heavy trucks, industrial equipment and the like. Thus, even if great skill and patience is used in setting up a reamer of the straight flute, spiral, blade floating or expansion type in order to provide a precision hole with a fine micrometer finish, such a set-up is not capable of performing continuously in an accurate manner from hour to hour or from day to day because of the above mentioned continuous change in alignment of the equipment.

Many types of special reamers and tools have been provided but they have unanimously failed to perform continuously thus causing machine down time plus the cost of either honing the reamer or moving the parts for a process of hand reaming which is the prevailing practice in large machine shops especially when a small precise size hole is required.

Accordingly, it is the primary object of the present invention to provide a ball floating reamer which will enable an unskilled worker to place the tool in a turret or the like for forming a precise hole size within the limits of plus .0001 to minus .0000 in the diameter even if the equipment of the machine is out of alignment as much as .032 of an inch in any direction and the reamer will not only hold the first piece formed to the precise size but will still form the same precise size hole many days later.

With the present reamer, the now costly and slow process of hand reaming will be eliminated as will be the cost of fluted and spiraled reamers. Another object of the present invention is to provide a reamer having a removable ball cutter thereon which is the only part receiving any wear and which is readily removable for replacement, the other part of the reamer receiving substantially no wear and thus being quite long lasting.

Still another important feature of the present invention is to provide a ball floating reamer in which the cutter is provided with peripheral cutting edges in which each edge is actually working very lightly thus causing an extended life of the ball cutter which has been found to have a considerably longer work life than any presently existing reamer.

The reamer of the present invention may be employed with various precision machines such as turret lathes, boring mills, drill presses and the like in order to precisely ream a hole within the limits mentioned previously regardless of the depth of the hole or the material and the hole will be formed without any chatter or scratches formed in the surface thereof.

Yet another important object of the present invention is to provide a ball floating reamer which is simple in construction, easy to use, extremely accurate in operation, efficient, long lasting, dependable and generally inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the reamer of the present invention;

FIGURE 2 is a longitudinal, sectional view taken substantially upon a plane passing along section line 2—2 of FIGURE 1;

FIGURE 3 is a detailed sectional view on an enlarged scale taken substantially upon a plane passing along section line 3—3 of FIGURE 2 illustrating the construction of the ball cutter;

FIGURE 4 is a transverse, sectional view taken substantially upon a plane passing along section line 4—4 of FIGURE 2 illustrating further structural details of the ball reamer cutter;

FIGURE 5 is a perspective view of a retainer or latch mechanism for securing the device in assembled condition; and FIGURE 6 is a perspective view of a plunger employed in the reamer.

Referring now specifically to the drawings, the numeral 10 generally designates the ball floating reamer of the present invention including an elongated cylindrical shell or housing 14 having a longitudinal bore 16 extending therethrough. The shell or housing 14 is adapted to be received in a chuck 18 or other suitable tool holder of a precision machine tool such as a turret lathe, drill press, boring mill or the like.

Disposed movably within the bore 16 is an elongated generally cylindrical plunger 20 having a compression coil spring 22 engaging one end thereof. The other end of the coil compression spring 22 is engaged with an adjustment plug or screw 24 which is in screw threaded engagement with an internally threaded portion 26 of one end of the bore 16. The screw 24 is provided with a polygonal head 28 disposed exteriorly of the shell 14 for rotational movement of the adjusting screw 24 thus varying the tension on the spring 22. A lock nut 30 is provided on the screw 24 for engaging the end of the shell 24 thus securing the adjusted screw 24 in longitudinally adjusted position for varying the tension on the compression spring 22. The lock nut 30 and head 28 are smaller than the shell 14 so that the shell 14 may be securely clamped in the chuck 18.

At the other end of the shell or casing 14, there is provided an axial extension 32 which is externally threaded as at 34 for receiving a ball latch or retaining mechanism generally designated by numeral 36 which includes a cylindrical body portion 38 that is internally threaded as at 40 together with a slight counterbore 41 for threaded engagement with the externally threaded extension 32. The outer or free end of the cylindrical body 38 is provided with a generally U-shaped bar or retaining member 42 extending diametrically of the cylindrical body 38 and having parallel side surfaces 44. The legs of the U-shaped member 42 form continuations of the peripheral walls of the cylindrical body and the bight portion extends diametrically of the internal diameter of the cylindrical body and also the bore 16 which has a constant diameter throughout the length of the extension 32.

Mounted on the ball latch is a ball cutter generally designated by numeral 46 having substantially a flat outer end surface 48 and a partial spherical surface 50 which is greater in extent than a hemisphere. The external surface of the spherical surface 50 is provided with a plurality of spiral flutes or cutting edges 52 and the center of the spherical surface 50 is smooth as at 54.

The ball reamer cutter 46 is retained in place by virtue of the U-shaped member 42 being received in a transverse notch 56 extending diametrically of the flat face 48 and also longitudinal notches or slots 58 disposed in the spherical surface 50 and in communication with the transverse notch or slot 56 thus receiving the bight portion and legs of the U-shaped member as illustrated in FIGURES 2 and 3 and also in FIGURE 4. Also, there is a plurality of relatively small spherical members or balls 60 disposed between the plunger 20 and the ball reamer cutter 46 with the uppermost spherical member or ball 60 rollingly engaging the flat end 62 of the plunger 20 and the lowermost ball 60 engaging the smooth spherical surface 54 on the cutter 46. As illustrated, the balls or spherical members 60 are freely movable and will engage each other substantially at a point contact and also will engage the internal surface of the longitudinal bore 16 and the surfaces 52 and 62 at a point contact for rolling engagement therewith whereby pressure of the spring 20 is transferred to the ball reamer cutter 46 in an obvious manner.

The engagement between the member 42 and the ball reamer cutter 46 enables driving of the cutter 46 in an obvious manner. In using the present invention, the cutter 46 is originally ground to the desired hole size as is any fluted or spiral reamer but the functional operation of the ball floating reamer is entirely different and opposite from normal reamers. For example, the ball reamer cutter 46 rolls into the hole center because it actually is floating by more than the machine would normally be out of alignment even if the machine were considerably misaligned. Further, the ball cutter begins to cut long before it reaches its full diameter because its configuration is exactly spherical and due to this, it must cut an exact hole size even though it has rolled slightly due to misalignment of machine parts. The ball bearings or spherical members 60 are touching each other and all of the balls have excess moving space laterally to find their own center at the slightest pressure in excess of any pressure placed on them by the plunger and spring which is originally adjusted for back pressure by the adjusting screw and the lock nut. The ball cutter 46 at no time touches any other item behind it except for the outermost ball bearing 60 which permits it sufficient freedom to enable the cutter to roll to the exact center point. Further, the cutter cuts on the full periphery of the ball thereof so that no movement in any direction is required whereby it can only cut a perfect size desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A generally cylindrical housing adapted to be received within a driving member of a machine tool, a ball reamer cutter mounted on the outer end of the housing for limited floating movement, said cutter being provided with a partial spherical surface having a spiral cutting flute thereon, spring means within the housing engaging the cutter for resiliently and frictionally retaining the cutter in a normal position whereby the cutter may roll to a center point for cutting a precision hole size, and driving connecting means between the housing and the cutter, said spring means including a plunger slidable in the housing, spring means engaging the plunger, an adjusting screw mechanism for varying the tension of the compression spring, a plurality of spherical balls arranged in the housing in alignment with each other with the innermost ball engaging the plunger and the outermost ball engaging said cutter, said cutter being provided with a partial spherical smooth surface for receiving the outermost ball.

2. The structure as defined in claim 1 wherein said plunger is provided with a flat end surface engaging the uppermost ball.

3. A generally cylindrical housing adapted to be received within a driving member of a machine tool, a ball reamer cutter mounted on the outer end of the housing for limited floating movement, said cutter being provided with a partial spherical surface having a spiral cutting flute thereon, spring means within the housing engaging the cutter for resiliently and frictionally retaining the cutter in a normal position whereby the cutter may roll to a center point for cutting a precision hole size, and driving connecting means between the housing and the cutter, said spring means including a plunger slidable in the housing, spring means engaging the plunger, an adjusting screw mechanism for varying the tension of the compression spring, a plurality of spherical balls arranged in the housing in alignment with each other with the innermost ball engaging the plunger and the outermost ball engaging said cutter, said driving connection between the cutter and the housing includes a generally U-shaped member on the end of the housing, said cutter having a transverse notch and longitudinal notches communicating therewith for receiving the U-shaped member thereby drivingly interengaging the housing and cutter.

4. The structure as defined in claim 3 wherein said U-shaped extension is mounted on a cylindrical member forming an extension of the housing, and screw threaded means interconnecting the housing and the cylindrical member.

5. A precision hole reamer comprising a generally cylindrical housing having an uninterrupted exterior surface, a ball reamer cutter mounted on the outer end of the housing in alignment therewith for limited floating movement, said cutter being provided with a partial spherical surface having a plurality of spiral cutting flutes thereon, said flutes extending radially beyond the exterior surface of the housing, spring means within the housing for resiliently retaining said cutter in a normal position, and driving connecting means between the housing and the cutter, said connecting means being in alignment with and of the substantially same width as the cylindrical housing.

6. The structure as defined in claim 5 wherein said driving connecting means includes a generally U-shaped member on the end of the housing, said cutter having a transverse notch and longitudinal notches communicating therewith for receiving the U-shaped member thereby drivingly interengaging the housing and cutter.

References Cited in the file of this patent

UNITED STATES PATENTS

| | | |
|---|---|---|
| 761,055 | Angell | May 31, 1904 |
| 2,855,811 | Fried | Oct. 14, 1958 |